United States Patent [19]

O'Donnell et al.

[11] 3,715,736

[45] Feb. 6, 1973

[54] MAGNETIC BUBBLE DOMAIN SYSTEM

[75] Inventors: Cedric F. O'Donnell, Fullerton; George R. Pulliam, Anaheim, both of Calif.

[73] Assignee: North American Rockwell Corporation

[22] Filed: April 1, 1971

[21] Appl. No.: 130,128

[52] U.S. Cl.....340/174 TF, 340/174 M, 340/174 VA

[51] Int. Cl.............................G11c 5/02, G11c 11/14

[58] Field of Search.................................340/174 TF

[56] References Cited

UNITED STATES PATENTS 3,540,019 11/1970 Bobeck et al...................340/174 TF

OTHER PUBLICATIONS

IBM Technical Disclosure Bulletin, Vol. 13, No. 9, Feb. 1971, pg. 2623.

The Bell Systems Technical Journal – "Properties and Device Applications of Magnetic Domains in Orthoterrites" by A. H. Bobeck, Oct. 1967; pgs. 1901 thru 1925.

*Primary Examiner*—James W. Moffitt

*Attorney*—L. Lee Humphries, H. Fredrick Hamann and Joseph E. Kieninger

[57] ABSTRACT

A magnetic bubble domain system having localized areas of spatial stability for bubble domains is disclosed. The bubble domain system includes a thin film of single crystal magnetic bubble domain material on a single crystal substrate. The film has a plurality of isolated thick portions surrounded by thinner regions. The bubble domains when formed preferentially move into the thick portions. The surrounding relatively thin regions of film serve as energy barriers to the movement of the bubble domains and confine the bubble domains in the relatively thick portions of the film. Bubble domains may be moved to and from the thick portions in a plurality of directions.

12 Claims, 2 Drawing Figures

INVENTORS
GEORGE R. PULLIAM
CEDRIC F. O'DONNELL
BY Joseph E. Kieninger
ATTORNEY

MAGNETIC BUBBLE DOMAIN SYSTEM

FIELD OF THE INVENTION

This invention relates to magnetic bubble domains and more particularly to a system containing localized areas of spatial stability for bubble domains.

BRIEF DESCRIPTION OF PRIOR ART

Magnetic domains and the propagation thereof in a magnetic medium are well known in the art and are described in U.S. Pat. Nos. 3,460,116; 3,470,546; 3,508,225; and others. In general, these patents describe the movement of single wall bubble domains in a shift register by the use of narrow metal patterns to control the positions of the bubbles. The methods described in these patents attempt to minimize the repulsive or interaction forces between the individual bubbles by separating the individual bubbles from each other by a distance which is about 3 or more bubble domain diameters. These methods try to substantially eliminate or minimize as much as possible the interaction forces between bubbles.

In a copending application to David Heinz, Ser. No. 81,232, filed Oct. 16, 1970, assigned to the Assignee of the present invention, a magnetic bubble domain system comprising one or more channels or strips of magnetic bubble domain material on a supporting substrate is described. Any number of individual magnetic bubble domain channels may be interconnected or connected to a main channel. The movement of bubble domains along a channel or strip is affected by the repulsive or reaction forces between bubble domains which are present in a channel when a bubble domain is formed or propagated near another bubble domain. The movement of bubbles from a given channel into one of several possible adjoining channels to form a logic function may be directed by the presence or absence of bubbles in one or more connecting channels. This application is incorporated herewith by reference thereto.

Another patent application assigned to the Assignee of the present invention, Ser. No. 123,644, filed Mar. 12, 1971, to Owens et al. describes a magnetic bubble domain system having bubble domains located in specific equilibrium positions in a strip or channel of magnetic bubble domain material film associated with the supporting substrate. The strip has at least one restricted portion therein which determines the position of a bubble domain in a nonrestricted strip portion associated therewith. The position or location of bubble domains in a strip of bubble domain film is predetermined by the proper spacing of restrictive strip portions. This application is incorporated herewith by reference thereto.

SUMMARY OF THE INVENTION

It is an object of this invention to provide an improved magnetic bubble domain system.

It is another object of this invention to provide a magnetic bubble domain system having predetermined positions for bubble domains.

It is yet another object of this invention to provide a method of forming a magnetic bubble domain system having predetermined positions for bubble domains.

It is still another object of this invention to avoid total reliance on metal patterns for controlling the positions of bubble domains.

It is yet still another object of this invention to provide a bubble domain system wherein bubble domains may be moved in a plurality of directions.

These and other objects of this invention are realized by a magnetic bubble domain system having a thin film of single crystal magnetic bubble domain material on a single crystal substrate. The film has a plurality of isolated thick portions surrounded by thinner regions. When bubble domains are formed in the film, they preferentially move into the thicker portions. The surrounding relatively thin regions of the film serve as energy barriers to the movement of the bubble domains and confine the bubble domains in the thick portions of the film. Bubble domains may be moved to and from the thick portions in a plurality of directions by conventional propagation methods.

Other objects and advantages of this invention will be apparent from the following detailed description wherein a preferred embodiment of the present invention is clearly shown.

DESCRIPTION OF AN ILLUSTRATIVE EMBODIMENT

In general, this invention describes a magnetic bubble domain system involving a plurality of isolated relatively thick portions of thin film single crystal bubble domain material on a supporting single crystal substrate which are surrounded by regions of the film having a thickness less than the thickness of the portions. The thicker portions of the bubble domain film represent lower energy positions for the bubble domains when a bias magnetic field is directed normal to the surface. The bubble domains preferentially position themselves in the thick portions of the film which have the lower energy level. The thinner regions of the film surrounding the thick portions have a higher energy level and serve as a barrier to the movement of the bubble domains thereby confining the bubble domains within the thick portions.

External force is applied by conventional methods to move a bubble domain from one thick portion to another thick portion of the film. A bubble domain may be moved in any direction from one thick portion to another thick portion. For example, a bubble domain in one thick portion can be moved upwardly, downwardly, to the left or to the right to a second thick portion. The bubble domain can also be moved back and forth between two thick portions or to any number of thick portions.

Figure 2:
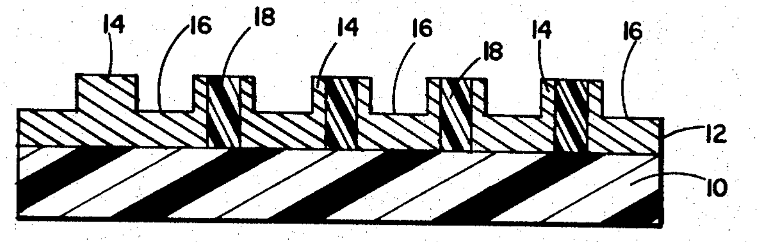
FIG. 2 is a cross-sectional view of the structure of FIG. 1.
Figure 1:
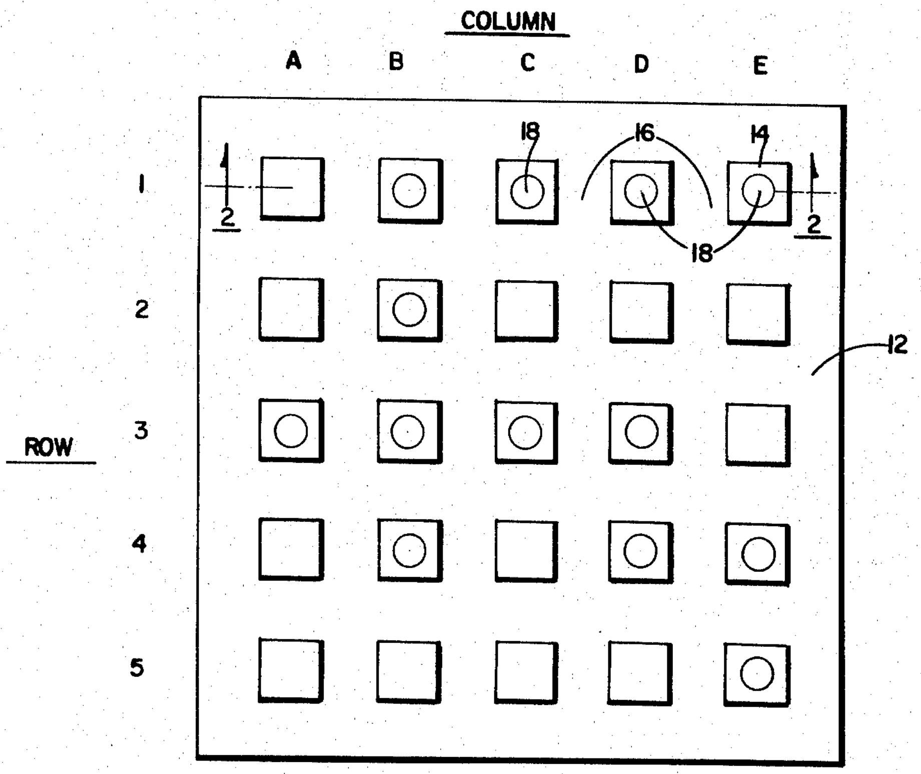
FIG. 1 is a top view showing thick film portions surrounded by thin film regions.

As shown in FIGS. 1 and 2, a monocrystalline substrate 10 is subjected to a chemical vapor deposition step to provide a thin film 12 of magnetic bubble domain material. The film 12 is subsequently etched to provide a plurality of relatively thick portions 14 surrounded by relatively thin regions 16. The regions 16 have a thickness less than the thickness of the portions 14. The shape of portions 14, preferably, is rectangular or circular, although this invention is not limited to any particular shape. The relatively thick portions 14 are isolated from each other by the relatively thin regions 16 and appear as islands in the film 12.

The deposition step is carried out in accordance with the copending patent application, Ser. No. 833,268, filed June 16, 1969, by Mee et al., and assigned to the Assignee of the present invention. This patent application is incorporated herewith by reference thereto.

The substrate 10 is preferably a monocrystalline garnet having a $J_3Q_5O_{12}$ formulation wherein the J constituent of the wafer formulation is at least one element selected from the group consisting of cerium, praseodymium, neodymium, promethium, samarium, europium, gadolinium, terbium, dysprosium, holmium, erbium, thulium, ytterbium, lutetium, lanthanum, yttrium, calcium, and bismuth; and the Q constituent of the wafer formulation is at least one element from the group consisting of indium, gallium, scandium, titanium, vanadium, chromium, manganese, rhodium, zirconium, hafnium, niobium, tantalum, aluminum, phosphorus, arsenic and antimony.

Examples of suitable substrate materials are $Y_{0.45}$, $Gd_{2.55}$, $Ga_5O_{12}$, $Dy_{0.65}Gd_{2.35}Ga_5O_{12}$ and $Sm_3Ga_5O_{12}$.

The film strip or channel 12 of bubble domain material is, preferably a single crystal garnet having a $J_3Q_5O_{12}$ formulation wherein the J constituent of the film formation has at least one element selected from the group of cerium, praseodymium, neodymium, promethium, samarium, europium, gadolinium, terbium, dysprosium, holmium, erbium, thulium, ytterbium, lutetium, lanthanum, and yttrium; the Q constituent of the film formulation is taken from the group consisting of iron, iron and aluminum, iron and gallium, iron and indium, iron and scandium, iron and titanium, iron and vanadium, iron and chromium, and iron and manganese.

Preferred film materials are iron garnets such as $Y_3Ga_{1.2}Fe_{3.8}O_{12}$ and $Tb_3Fe_5O_{12}$.

The composite iron garnet film-substrate structure has a film with a given magnetostriction constant and a given difference between the lattice constants of the film and substrate. This requirement is discussed in detail in the copending patent applications Ser. Nos. 101,785, 101,786 and 101,787, all filed Dec. 28, 1970 by Mee et al, which are incorporated herewith by reference thereto.

While garnets are the preferred materials for the substrate thin film, other oxide materials may be used for the substrate, especially when the film is formed of an orthoferrite material.

The portions 14 are formed preferably by an etchant step using photolithographic etching techniques of the type commonly used in the semiconductor industry and by employing an etchant such as hot phosphoric acid. The hot phosphoric acid in this case would etch the mask free areas of film 12 to form the relatively thin regions 16. The masked portion of the film 12 which is not etched becomes the relative thick portions 14. While chemical etching is the preferred manner of forming the portions 14, other methods such as sputter etching, laser machining and the like may be used.

The size of the portions 14 is not critical in the practice of this invention. However, it is understood that the size of the portion 14 would be greater than the size of the bubble domains formed in the particular film. For example, bubble domains in substituted iron garnet have a diameter of the order of about 0.0003 inches. In this case, the diameter of the portion 14 should be of the order of 0.001 inches or greater. This invention is not limited to portions 14 having a size which is sufficient to confine only one bubble domain. That is, if desired, portion 14 may contain a plurality of bubble domains. Preferably, in many applications it would be desirable for portion 14 to be of a size large enough to conveniently contain one bubble domain therein.

Bubble domains 18 are formed in the conventional manner by applying the appropriate magnetic field over the structure shown in FIGS. 1 and 2. Bubble domains 18 may be formed in only one portion 14 or they may be formed in a plurality of portions 14. The bubble domain 18 that is formed in the film 12 will be positioned in the thick portion 14 because the energy level in portion 14 is lower than in the thinner surrounding region 16. The surrounding region 16, having a higher energy level, acts as a restraining barrier to the movement of bubble domains from one thick portion to another. The amount of restraint afforded by the surrounding regions 16 is inversely proportional to the thickness thereof. The thicker the surrounding region 16, the less the restraining force. For example, a restraining region 16 which is 90 percent as thick as portion 14 will restrain a bubble domain in portion 14 less than a restraining portion 16 having a thickness about 50 percent of the thickness of portion 14. As a result, the amount of restraint between portions 14 can be readily adjusted by regulating the thickness of the restraining film region 16.

One of the primary advantages of this type of spatial stability bubble domain systems is the ability to move a bubble in two directions, for example the "X" and "Y" directions. For example, as shown in FIG. 1, a bubble domain may be moved in the "X" direction along any one of the rows, that is, from Column A to Column E and from Column E to Column A. Similarly, a bubble domain may be moved in the "Y" direction in any one of the columns. For example, a bubble domain in Column A can be moved from Row 1 to Row 5 or from Row 5 to Row 1. The bubble domains may be moved from one row to another and from one column to another and any combination thereof. This flexibility is a very valuable tool and overcomes the shortcoming of the prior art systems which move unidirectionally, that is, either in the "X" direction or in the "Y" direction.

The bubble domains in the portions 14 may be moved horizontally, vertically, and/or diagonally if desired. Numerous configurations of portions 14 other than that shown in FIG. 1 may be designed for specific applications. Another embodiment included in this invention would contain a first portion 14 surrounded by a plurality of portions 14 positioned in a circular arrangement about the first portion 14. The number of configurations and designs is unlimited. FIG. 1 is a preferred configuration having a plurality of columns and rows.

Another specific embodiment is a hexagonal-shaped first portion 14 surrounded by six evenly spaced hexagonal-shaped thick portions 14. A bubble domain can be moved in six directions from the first portion 14.

Still another specific embodiment is an octagonal-shaped first portion 14 surrounded by eight evenly spaced octagonal-shaped thick portions 14. A bubble domain can be moved in eight directions from the first portion 14.

The flexibility of the bubble domain system described herein containing a plurality of preferred positions for bubble domains has numerous applications. In addition to use in shift registers, it may be used in logic systems, in switching systems, dial telephones and the like.

We claim:

1. A magnetic bubble domain system having localized areas of spatial stability for bubble domains comprising a substrate, a thin film of magnetic bubble domain material on said substrate, a first portion of said film having a first thickness, said first portion being surrounded by a first region of said film having a thickness less than said first portion, and a second portion of said film having a second thickness, said second portion being surrounded by a second region of said film having a thickness less than said second portion, said second portion being in spaced relation with said first portion wherein a bubble domain may be moved from said first portion to said second portion.

2. A magnetic bubble domain system having localized areas of spatial stability for bubble domains comprising a substrate, a thin film of magnetic bubble domain material on said substrate, a first portion of said film having a first thickness, said first portion being surrounded by a first region of said film having a thickness less than said first portion, and a plurality of portions of said film having a second thickness, said plurality of portions being surrounded each by a region of said film having a thickness less than said plurality of portions, said plurality of portions being in spaced relation with said first portion wherein a bubble domain may be moved from said first portion to said plurality of portions.

3. A magnetic bubble domain system as described in claim 2 wherein the thickness of said first portion is substantially the same as said plurality of portions.

4. A magnetic bubble domain system as described in claim 2 wherein said plurality of portions are arranged in a pattern around said first portion.

5. A magnetic bubble domain system as described in claim 2 wherein at least two of said plurality of portions are arranged on opposite sides of said first portion.

6. A magnetic bubble domain system as described in claim 2 wherein at least two of said plurality of portions are spaced so as to form an angle of about 90° with said first portion.

7. A magnetic bubble domain system as described in claim 2 wherein the shape of said first portion is round.

8. A magnetic bubble domain system having localized areas of spatial stability for bubble domains comprising, a substrate, a thin film of magnetic bubble domain material on said substrate, a first portion of said film having a first thickness, said first portion being surrounded by a first region of said film having a thickness less than said first portion, a second portion of said film having a second thickness, said second portion being surrounded by a second region of said film having a thickness less than said second portion, said second portion being in spaced relation in an "X" type direction with said first portion wherein a bubble domain may be moved from said first portion to said second portion, and a third portion of said film having a third thickness, said third portion being surrounded by a third region of said film having a thickness less than said third portion, said third portion being in spaced relation in a "Y" type direction with said first portion wherein a bubble domain may be moved from said first portion to said third portion.

9. A magnetic bubble domain system having localized areas of spatial stability for bubble domains comprising, a substrate, a thin film of magnetic bubble domain material on said substrate, a first portion of said film having a first thickness, said first portion being surrounded by a first region of said film having a thickness less than said first portion, a second portion of said film having a second thickness, said second portion being surrounded by a second region of said film having a thickness less than said second portion, said second portion being in spaced relation with said first portion wherein a bubble domain may be moved moved from said first portion to said second portion, a third portion of said film having a third thickness, said third portion being surrounded by a third region of said film having a thickness less than said third portion, said third portion being in spaced relation with said first portion wherein a bubble domain may be moved from said first portion to said third portion, a fourth portion of said film having a fourth thickness, said fourth portion being surrounded by a fourth region of said film having a thickness less than said fourth portion, said fourth portion being in spaced relation with said first portion wherein a bubble domain may be moved from said first portion to said fourth portion, and a fifth portion of said film having a fifth thickness, said fifth portion being surrounded by a fifth region of said film having a thickness less than said fifth portion, said fifth portion being in spaced relation with said first portion wherein a bubble domain may be moved from said first portion to said fifth portion.

10. A method of controlling the spatial stability of bubble domains in a bubble domain system having a film of bubble domain material associated with the substrate comprising the steps of forming a plurality of distinct portions in said film having a first thickness which are surrounded by a region of film material having a thickness less than said portion whereby bubble domains are restrained in said portions by said regions.

11. A method as described in claim 10 whereby said portions are formed by etching the film.

12. A method of localizing areas of spatial stability for bubble domains suitable for use as a multiple position shift register and having a film of bubble domain material associated with the substrate comprising the steps of forming at least two portions in said film having a first thickness which are surrounded by regions of the film having a thickness less than said portions whereby bubble domains are restrained in said portions by said regions.

* * * * *